United States Patent [19]
Amanuma et al.

[11] Patent Number: 5,617,166
[45] Date of Patent: Apr. 1, 1997

[54] CAMERA CAPABLE OF REDUCING IMAGE BLUR

[75] Inventors: Tatsuo Amanuma, Ageo; Sueyuki Ohishi, Tokyo; Yoshio Imura, Kawasaki; Toshiyuki Nakamura, Tokyo, all of Japan

[73] Assignee: Nikon Corporation, Tokyo, Japan

[21] Appl. No.: 375,688

[22] Filed: Jan. 20, 1995

[30] Foreign Application Priority Data

Feb. 3, 1994 [JP] Japan .................................. 6-011670
Feb. 3, 1994 [JP] Japan .................................. 6-011671

[51] Int. Cl.⁶ .................................................. G03B 17/00
[52] U.S. Cl. ............................................................ 396/55
[58] Field of Search .................................. 354/400, 410, 354/430, 202, 266, 267.1, 268, 286; 359/554–557

[56] References Cited

U.S. PATENT DOCUMENTS

| | | | |
|---|---|---|---|
| 5,109,249 | 4/1992 | Kitajima | 354/410 |
| 5,237,365 | 8/1993 | Miyazawa | 354/456 |
| 5,245,378 | 9/1993 | Washisu | 354/410 |
| 5,307,113 | 4/1994 | Egawa | 354/430 |
| 5,416,554 | 5/1995 | Hamada et al. | 354/400 |

*Primary Examiner*—D. Rutledge
*Attorney, Agent, or Firm*—Oliff & Berridge

[57] ABSTRACT

This camera capable of image blur reduction includes a command device which outputs a photography command in response to a operation for photography, a photographic device which performs photography, and a control device which, in order to reduce blurring of a photographic image, actuates the photographic device after a predetermined time period has elapsed from the time point that the photography command was output.

20 Claims, 10 Drawing Sheets

CAMERA CAPABLE OF REDUCING IMAGE BLUR

BACKGROUND OF THE INVENTION

1. Field of the Invention

The present invention relates to a camera which is capable of restraining to the minimum level blurring of the photographic image (image blur) which is generated by vibration of the camera.

2. Description of the Related Art

A camera which is equipped with an image blur reduction device in which an image blur reduction lens is moved in the directions perpendicular to the optical axis of the photographic lens is per se known. In this type of camera, the amount of vibration of the camera caused by shaking of the photographer's hand or similar reasons is detected by a camera vibration sensor which may for example be an angular velocity sensor or an angular accelerometer or the like; and the amount of image blur is reduced by moving the image blur reduction lens appropriately during the process of photography, based upon the output of the vibration detection sensor. However, with prior art such image blur reduction cameras, the timing of the blur reduction operation, and of photographic operation, have not been completely correct, and for this reason the problem has tended to arise that the blur reduction process has not been accurately executed.

SUMMARY OF THE INVENTION

The objective of the present invention is to restrain image blur to the minimum level, for a camera which does have such an image blur reduction device, and even for a camera which does not have such an image blur reduction device.

In order to attain this objective, the camera capable of image blur deduction is provided with a command device which outputs a photography command in response to a operation for photography, a photographic device which performs photography, and a control device which, in order to reduce blurring of a photographic image, actuates the photographic device after a predetermined time period has elapsed from the time point that the photography command was output.

Since photography is performed after the predetermined time period has elapsed from the time point at which the photography command was output, i.e. after vibration of the camera generated as a result of the operation for photography has died away, therefore it is possible to restrain image blur to the minimum level.

BRIEF DESCRIPTION OF THE DRAWINGS

FIGS. 4A through 5B are flow charts showing the details of a photographic processing routine executed by this CPU;

DETAILED DESCRIPTION OF THE PREFERRED EMBODIMENTS

First Embodiment

The first preferred embodiment of the present invention, which is an application thereof to a lens shutter type camera having a image blur deduction device, will now be explained with reference to FIGS. 1 through 5B.

Figure 1:
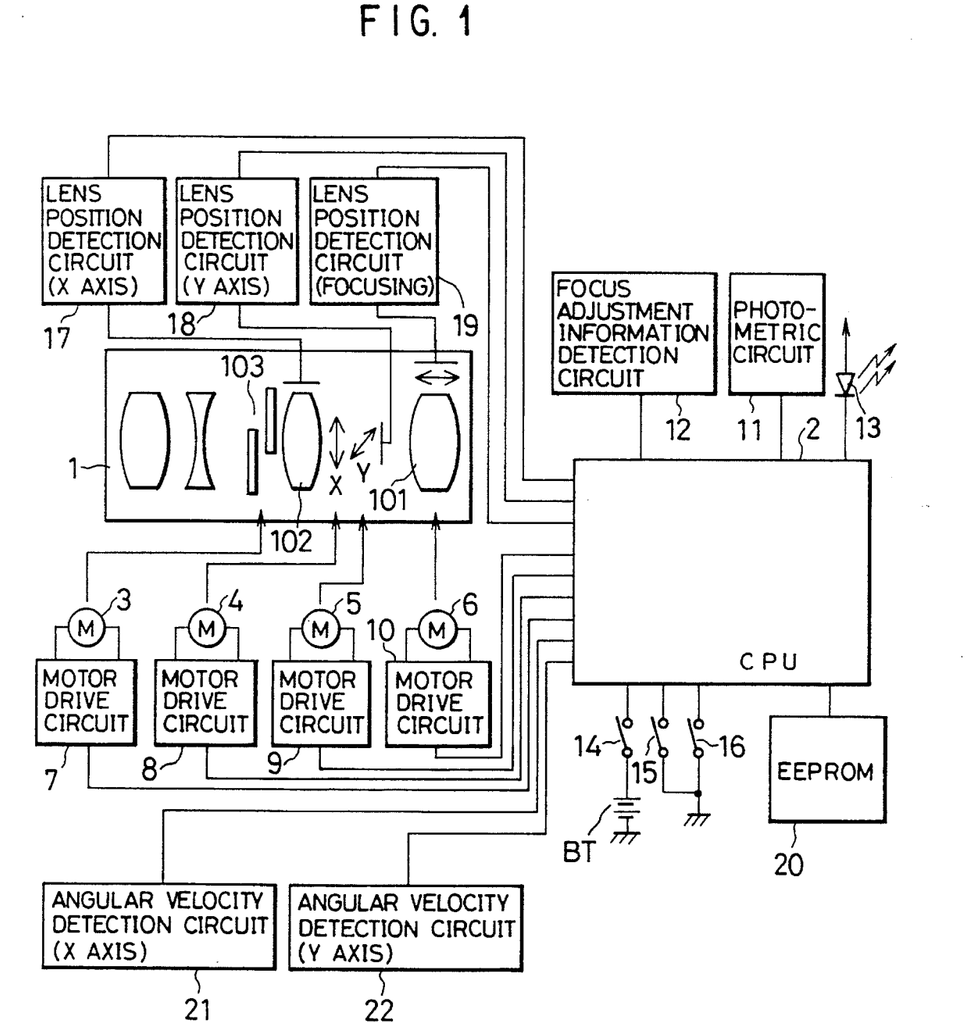
FIG. 1 is a block diagram showing the control system of a camera capable of image blur reduction according to the first preferred embodiment of the present invention.

FIG. 1 is a block diagram showing a control system which is suitable for a camera capable of image blur reduction according to the present invention. The reference numeral 1 generally denotes a photographic lens assembly, and this photographic lens assembly 1 has a focus lens 101 which can be shifted to and fro along the optical axis, an image blur reduction lens 102 which can be shifted perpendicular to the optical axis both in an X direction (the vertical direction) and also in a Y direction (the horizonal direction: the direction perpendicular to the drawing paper), and other lenses not relevant to the principle of the present invention. A motor 4 and a motor 5 are provided for shifting the image blur reduction lens 102 in the X direction and in the Y direction, respectively. A motor 6 is provided for shifting the focus lens 101 to and fro along the optical axis. In front of the blur reduction lens 102 there is provided a combination iris and shutter 103 (hereinafter simply termed a shutter), and a motor 3 is provided for operating this shutter 103.

Motor drive circuits 7 through 10 drive the motors 3 through 6, respectively, by varying the pulse widths of drive signals for them according to the amount of drive which is required, in other words according to duty factor control. When one of the motors 3 through 6 is to be operated, a CPU 2 inputs a drive direction signal and a drive duty factor signal to the appropriate one of the drive circuits 7 through 10. These drive direction signals are signals which specify the rotational directions for driving the motors 3 through 6, while these drive duty factor signals are signals which specify the rotational amounts for driving the motors 3 through 6. Rotation of the motor 4 or of the motor 5 is changed to linear movement via an image blur reduction lens drive mechanism to shift the image blur reduction lens 102 in the X direction or in the Y direction, respectively.

The CPU 2 is a unitary single chip microcomputer of a per se known type which incorporates a timer, A/D converters, counters etc., and performs sequence control for the camera as a whole. To this CPU 2 there are connected a photometric circuit 11 which measures the brightness of the target object, a focus adjustment information detection circuit 12 which detects focus adjustment information of the photographic lens assembly 1, and a camera vibration display device 13 for displaying the vibration state of the camera. This display device 13, in this first preferred embodiment, is constituted as an LED, and its blinking frequency is changed according to the amount of camera vibration. Further, to the CPU 2 there are connected a main switch 14 which controls the supply of actuating electrical power from a power source battery BT to the various sections of the camera, a first stroke switch 15 which is turned on when a shutter release button, not shown, is depressed as far as its first stroke position, and a second stroke switch 16 which is turned on when the shutter release button is depressed all the way to its second stroke position. The main switch 14 is operated by being temporarily shifted either to the on position or to the off position, and maintains its thus set state until it is again operated.

To the CPU 2 there are further connected an X axis lens position detection circuit 17 which detects the position along the X axis of the image blur reduction lens 102, a Y axis lens position detection circuit 18 which detects the position along the Y axis of the image blur reduction lens 102, a focus lens position detection circuit 19 which detects the position along the optical axis of the focus lens 101, an EEPROM 20 which stores data required for photographic processing such as adjustment values and the like, an X axis angular velocity detection circuit 21 which detects the angular velocity of the camera body around the X axis (i.e. the yawing angular velocity) set up as a result of camera vibration, and a Y axis angular velocity detection circuit 22 which detects the angular velocity of the camera body around the Y axis (i.e. the pitching angular velocity) set up as a result of camera vibration.

Each of the lens position detection circuits 17 through 19 outputs a pulse signal, the number of pulses in which corresponds to the position of the relevant lens (102 or 101) along the relevant direction. The CPU 2, by counting the number of pulses in these pulse signals, determines the position and the amount of displacement in the relevant direction of the relevant lens 102 or 101, and also is able to determine, from the amount of lens displacement over a predetermined time period, the velocity of displacement of the relevant lens.

Figure 2:
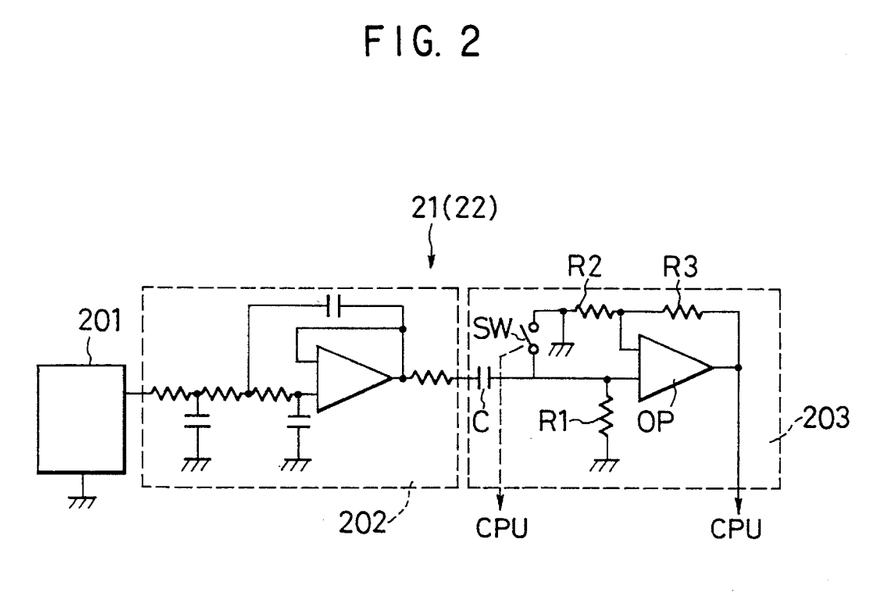
FIG. 2 is a circuit diagram showing the details of two angular velocity detection circuits which appear in FIG. 1 as blocks.

FIG. 2 is a circuit diagram which shows the details of the above described angular velocity detection circuits 21 and 22. 201 denotes an angular velocity sensor which detects the angular velocity of the camera body, around the relevant axis (the X axis or the Y axis) set up as a result of camera vibration. 202 is a low pass filter which suppresses high frequency component noise contained in the output signal from the angular velocity sensor 201. 203 is a high pass filter and amplifier which, as well as suppressing low frequency component noise contained in the output signal from the low pass filter 202, also amplifies the output of this low pass filter 202. The condenser C and the resistor R1 together constitute the high pass filter, while the op amp OP constitutes the amplifier. The output of the op amp OP is input to the CPU 2 shown in FIG. 1. Further, an analog switch SW is connected to one of the input terminals of the op amp OP, with the intention of reducing the offset value of the output of this op amp. The outputs of the angular velocity detection circuits 21 and 22 vary according to the magnitude of the corresponding angular velocities detected by them, and generally, the larger is the magnitude of the angular velocity, the larger is the amplitude of the output of the corresponding circuit.

Moreover, it is desirable to increase the source voltage which is supplied to the amplifiers, in order to increase the accuracy of detection of camera vibration performed by the angular velocity detection circuits 21 and 22, but there is a fixed limit for this. In this connection, it is general for the direct current components in the outputs of the sensors 201 to be cut off before they are input to the amplifiers, and for the amounts of camera vibration to be detected from the magnitudes of the amplitudes of the alternating current components in the outputs from these sensors 201.

However, when the direct current components are to be cut off, it becomes impossible easily to detect the reference levels of the amplified voltage signals (which correspond to the signal levels when no camera vibration is present, and are hereinafter termed the angular velocity zero voltages). Determination of the amount of camera vibration cannot be accurately performed by the CPU 2 if these angular velocity zero voltages are not detected, and, for example, the problem may arise that the image blur reduction lens 102 is driven although actually no camera vibration is present.

Therefore, the CPU 2 averages the output of the amplifiers, for example based upon the result of time differentiating the output of the amplifiers, and therefrom determines the above described angular velocity zero voltages. Further, more accurate values for the angular velocities can be obtained by extracting the angular velocity zero voltages from the output voltages of the angular velocity detection circuits 21 and 22. In other words, the detected output signals of the angular velocity detection circuits 21 and 22 are compensated according to the corresponding angular velocity zero voltages.

Next, the procedure followed by the CPU 2 for implementing this first preferred embodiment of the present invention will be explained, with reference to the flow charts shown in FIGS. 3 through 5B.

Figure 3:
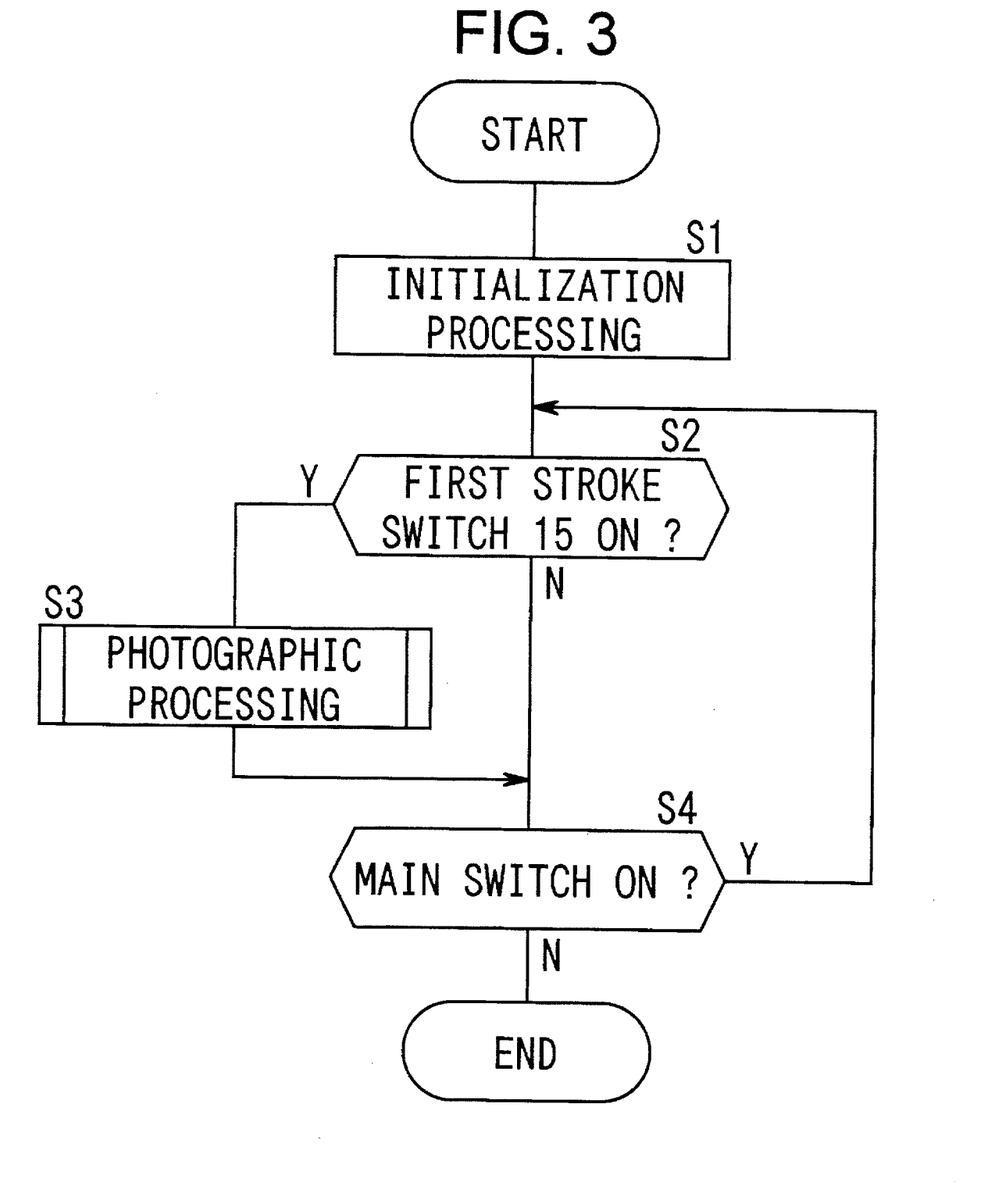
FIG. 3 is a flow chart showing the operation of a main program executed by a CPU which appears in FIG. 1.

FIG. 3 is a flow chart showing the operation of a main program executed by the CPU 2. The CPU 2 starts to execute this main program when the main switch 14 is turned on. In the step S1, initialization of various registers and the like within the CPU 2 is performed. In the step S2, a decision is made as to whether the first stroke switch 15 is on or off. If the switch 15 is on, then the flow of control proceeds to the step S3, in which a photographic processing routine which will be described hereinafter is executed, and then the flow of control proceeds to the step S4. If however the first stroke switch 15 is off, then the flow of control proceeds directly to the step S4, in which a decision is made as to whether or not the main switch 14 is on. If it is on, the flow of control returns to the step S2, while if it is off the execution of this main program is terminated.

FIGS. 4A through 5B are flow charts showing the details of the photographic processing routine executed by the CPU 2 and shown as the step S3 of FIG. 3.

Figure 4A:
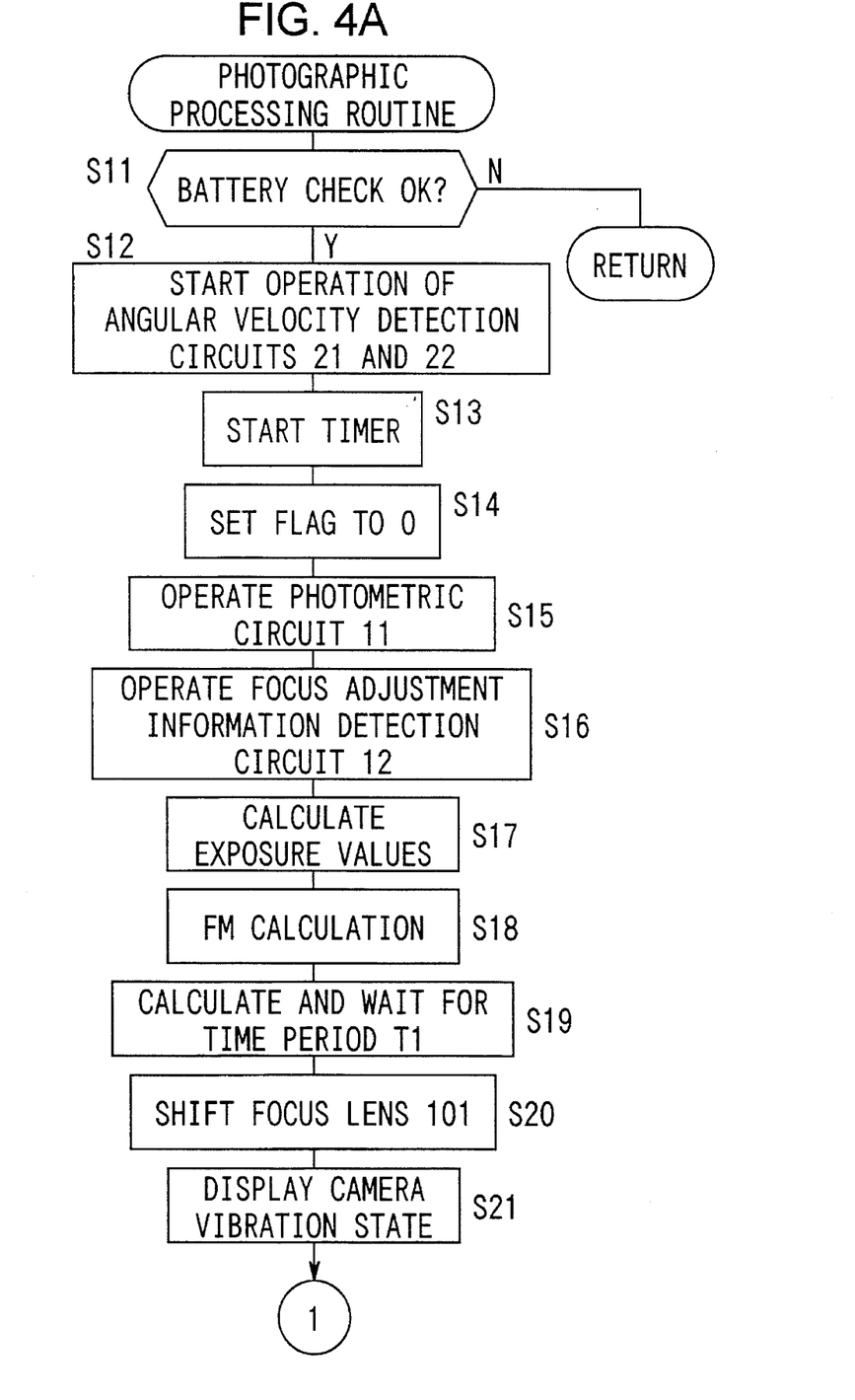

In the step S11 of the FIG. 4A flow chart a battery BT check is performed. I.e., the output voltage of the power source battery BT, is measured, and a decision is made as to whether or not this voltage is at least equal to a predetermined voltage value sufficient for operation. Since it is desirable for a certain load to be imposed upon the battery BT during this measurement process in order to obtain an accurate value for the battery BT voltage, therefore the motor drive circuit 7 (for example) is operated while the battery voltage is measured. If the result of the decision in this step S11 is NO (i.e., the battery voltage is not sufficient), then the flow of control returns from this routine; while, if the decision is YES then the flow of control proceeds to the step S12. In the step S12, the operation of the angular velocity detection circuits 21 and 22 is started.

Because in this manner it is ensured, in this first preferred embodiment, that camera vibration detection processing is not performed when the value of the battery voltage is below a predetermined voltage value, therefore it is possible to guarantee that the problem never arises that the accuracy of camera vibration detection becomes deteriorated, due to the battery voltage being too low, in which case inaccurate image blur reduction processing might come to be performed.

When the operation of the angular velocity detection circuits 21 and 22 is started, angular velocity signals representative of the amounts of camera vibration around the relevant axes are output from these angular velocity detection circuits 21 and 22. Further, as described above, based upon the results of time differentiation of the outputs from the amplifiers included in the angular velocity detection circuits 21 and 22, the CPU 2 averages the outputs of the amplifiers, and by doing this commences processing to determine their angular velocity zero voltages. For example, after the step S12, a timer interrupt may be generated for the CPU 2 at predetermined time intervals, and this processing for determining the angular velocity zero voltages may be performed as interrupt processing upon this timer interrupt.

In the step S13 a timer in the CPU 2 is started. This timer is for timing the time period needed for calculating the angular velocity zero voltages as described above, which is hereinafter termed the angular velocity zero voltages calculation time. This angular velocity zero voltages calculation time is determined in advance by experiment or the like, and its value is stored in the EEPROM 20. In this description of the first preferred embodiment, it will be supposed that this angular velocity zero voltages calculation time is set to 900 ms. In the step S14 the initial value of a flag is set to zero. This flag is for indicating whether or not the timer described above has run out (i.e. whether or not its timed period is up), and when this timer runs out the value of the flag is changed from zero to unity.

In the step S15 an operation command signal is sent to the photometric circuit 11, so that photometric processing commences. In the step S16 an operation command signal is sent to the focus adjustment information detection circuit 12, so that focus detection processing commences. In the step S17 an exposure calculation is performed, based upon the results of the photometric process, in order to determine appropriate values for exposure, i.e. in order to determine an appropriate iris opening value and an appropriate shutter speed. In the step S18, by performing flashmatic calculation (FM calculation), the distance at which photography is possible when using an electronic flash device is determined.

In the step S19, based upon the equation below, a waiting time period T1 (hereinafter termed the angular velocity detection circuit stabilization time period) is determined which is sufficient to ensure that the output of the angular velocity detection circuits 21 and 22 has become stabilized, and the CPU 2 waits for this waiting time period T1 before proceeding onwards from this step S19.

$$T1 = 300 \text{ ms} - (Tp + Tf)$$

Here, Tp is the time period required for the photometric process (in the step S15), and Tf is the time period required for detection of the focus adjustment information (in the step S16).

By waiting in the above described step S19 for exactly this angular velocity detection circuit stabilization time period T1, without any dependence upon the time periods which were required for the photometric process and for the focus adjustment information detection process, it is ensured that the flow of control does not continue to the next step S20 until a time period of 300 ms has elapsed from the time point at which the operation of the angular velocity detection circuits 21 and 22 was commenced. This time period of 300 ms is, in this preferred embodiment, the time period required for the stabilization of the output of the angular velocity sensors 201 included in the angular velocity detection circuits 21 and 22.

Figure 4B:
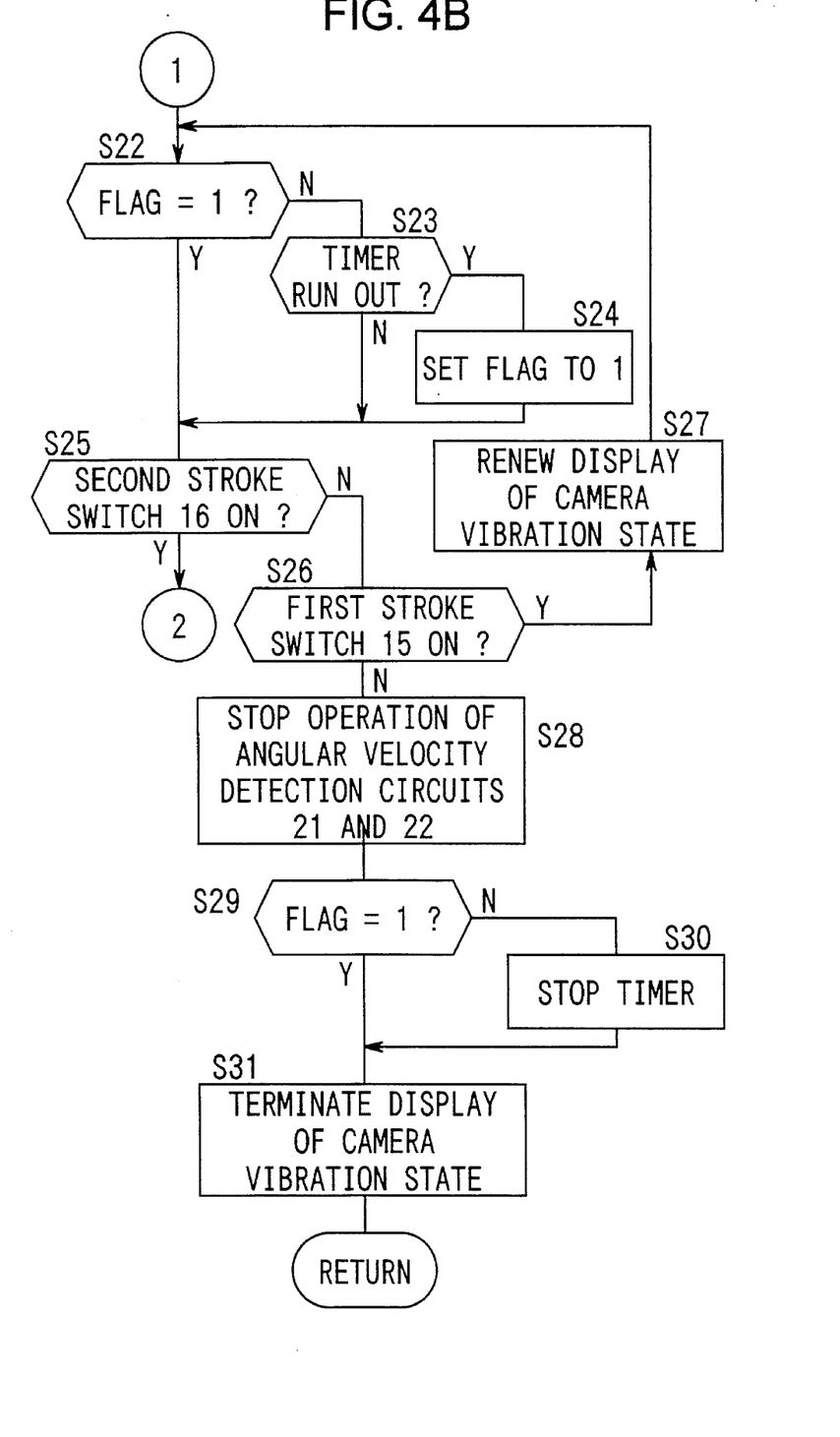

In the step S20 the photographic lens assembly 1 is focused upon the object to be photographed, by the focus lens 101 being shifted along the optical axis based upon the results of the focus adjustment information detection process which was performed in the step S16. The time required for this axial shifting of the focus lens 101 is typically of the order of about 100 ms. In the step S21, the amount of camera vibration is calculated based upon the outputs of the angular velocity detection circuits 21 and 22, and a signal corresponding to this camera vibration amount is sent to the camera vibration display device (the LED) 13. This display device 13 provides a display corresponding to the amount of vibration of the camera. In concrete terms, it blinks with the frequency corresponding to the overall amount of vibration of the camera.

In this manner, in this first preferred embodiment, after at least a time period of 300 ms has elapsed after time point at which the operation of the angular velocity detection circuits 21 and 22 has been commenced, i.e. when the outputs of the sensors 201 have had enough time to reach the stable state, display of the camera vibration is provided, and thereby it is possible to furnish an accurate display of the amount of vibration of the camera.

In the step S22, a decision is made as to whether or not the value of the flag is currently set to unity. If the current value of the flag is not unity, then the flow of control proceeds to the step S23, in which a decision is made as to whether or not the time period being timed by the timer has run out. This decision relating to the running out of the time period is performed by reading in the calculation time period stored in the EEPROM 20 for the angular velocity zero voltages (typically 900 ms), and by deciding whether or not this calculation time period for the angular velocity zero voltages has elapsed from the time point at which the timer was started. If the time period being timed by the timer has indeed run out, then the flow of control proceeds to the step S24, in which the value of the flag is set to unity and the flow of control proceeds to the step S25. While the time period is not run out, the flow of control proceeds to the step S25 directly. If on the other hand in the step S22 it is decided that the current value of the flag is unity, then also the flow of control proceeds to this step S25, in which a decision is made as to whether or not the second stroke switch 16 is on. If the switch 16 is in fact off, then the flow of control proceeds to the step S26, in which a decision is made as to whether or not the first stroke switch 15 is on. If the result of this decision is that the switch 15 is indeed on, then the flow of control proceeds to the step S27, in which the display of the camera vibration state on the display device 13 is renewed, based upon the outputs of the angular velocity detection circuits 21 and 22, and then the flow of control is returned to the step S22.

On the other hand, if in the step S26 it is determined that the first stroke switch 15 is off, then the flow of control proceeds to the step S28, in which command signals are sent to the angular velocity detection circuits 21 and 22 in order to stop their action for angular velocity detection. The flow of control then proceeds to the step S29, in which a decision is made as to whether or not the flag is currently set to unity. If the current value of the flag is not unity, then the flow of control proceeds to the step S30, in which the timer is stopped, and then the flow of control proceeds to the step S31, in which the display of the camera vibration state on the display device 13 is terminated. On the other hand, if the current value of the flag is unity, then the flow of control proceeds to this step S31 directly without the timer being stopped. After this step S31 the flow of control returns to the main program whose flow chart is shown in FIG. 3.

Figure 5A:
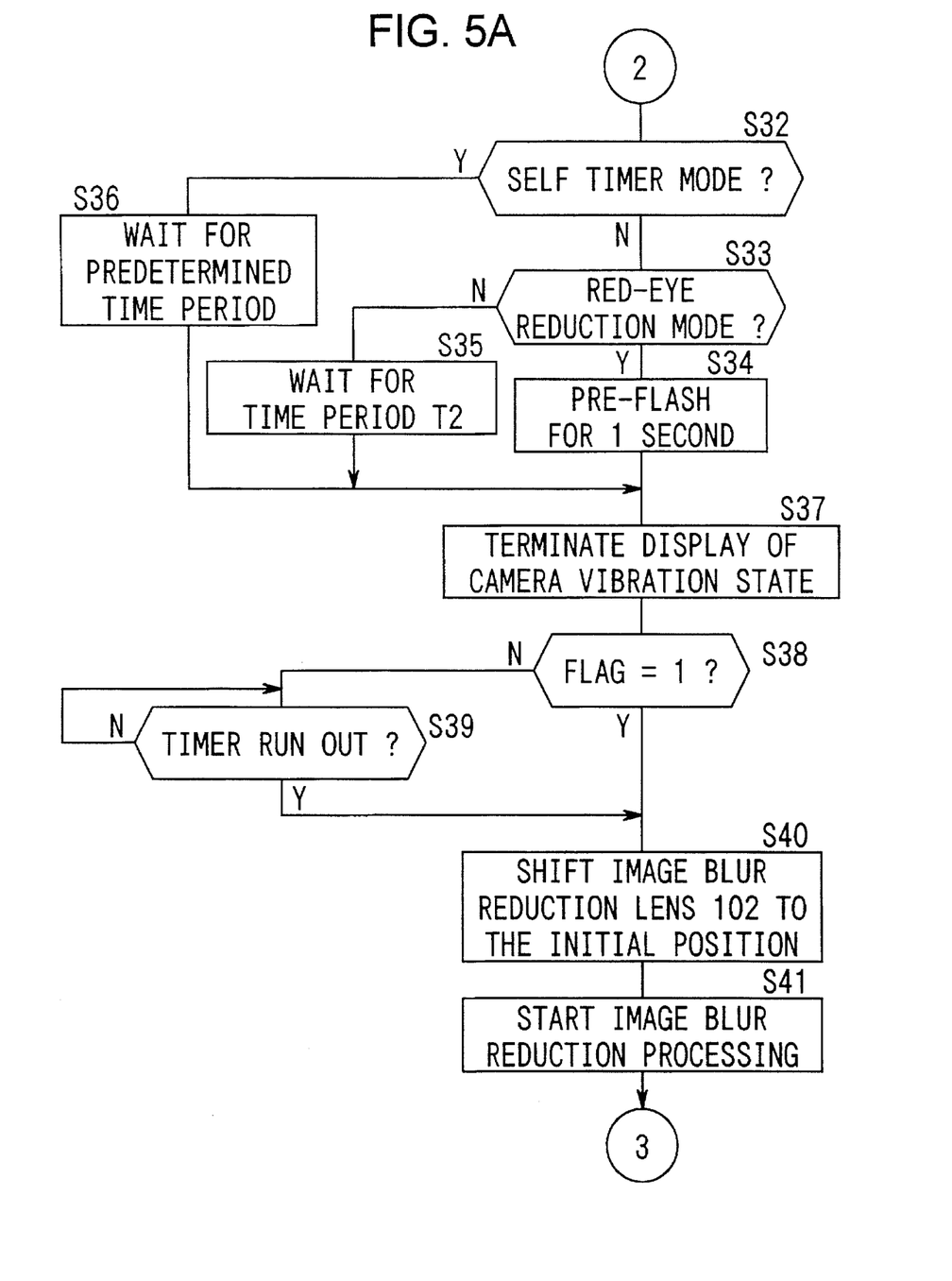

On the other hand, if in the step S25 it is decided that the second stroke switch 16 is on, then the flow of control proceeds to the step S32 of the FIG. 5A flow chart, in which a decision is made as to whether or not the self timer mode is set. By the self timer mode is meant a mode of operation in which photography is performed after a time period set by the self timer has elapsed from the time point that the second stroke switch 16 is turned on. If the self timer mode is set the flow of control is directed to the step S36 in which time measurement is performed, and after the end of a predetermined time period the flow of control continues to the step S37.

If the self timer mode is not set, the flow of control is directed to the step S33, in which a decision is made as to whether or not the red-eye reduction mode is set. By red-eye is meant a phenomenon in which during flash photography the light from an electronic flash device is reflected back from very fine blood vessels (capillaries) at the bottoms of the eyeballs of human photographic subjects, thus causing their eyes to appear red in the photograph. For this reason, in the red-eye reduction mode, the electronic flash device is caused to emit a weak flash of light a short time before the actual photographic operation, and this weak flash illuminates the eyes of the human subject or subjects and causes their irises involuntarily to contract somewhat; and at this instant the flash device is again activated, this time at full power, and the photograph is shot. This preliminary flashing for reduction of the red-eye phenomenon will hereinafter be termed pre-flashing.

If the red-eye reduction mode is set, then the flow of control proceeds to the step S34, in which pre-flashing is performed for a time period of approximately one second, and then the flow of control proceeds to the step S37. If however the red-eye reduction mode is not set, then the flow of control proceeds to the step S35, in which the system waits for a predetermined time period. I.e., a time counting is started by the CPU 2, and after a predetermined time period has elapsed the flow of control continues. This time period, which hereinafter will be termed the shock avoidance time period T2, is determined as being the time period which is required for the vibration of the camera generated by pressing the shutter release button thereof to die away sufficiently. By providing this time delay process in this step S35, it is ensured that the image blur reduction operation (in the step S41) which will be described hereinafter is performed after at least this shock avoidance time period T2 has elapsed from the moment that the second stroke switch 16 is turned on. The reason for doing this is described below.

Generally, it takes a certain time period from the time point that the second stroke switch 16 is turned on until photography begins, and therefore, if blur reduction action is started immediately in response to this turning on of the second stroke switch 16, it will happen that meaningless blur reduction operation will be performed for a certain time period before the actual photographic operation commences. Not only is this unfavorable, but also there is the problem that directly after the second stroke switch 16 has been turned on the camera is typically vibrating to a considerable degree, this vibration having been generated by the photographer depressing the shutter release button; and, if blur reduction operation is performed based upon this considerable but temporary vibration, there is a fear that a bad influence will be exerted upon the subsequent image blur reduction operation that is actually required at the time of photography. Accordingly, this first preferred embodiment is so constructed that the blur reduction operation and also the photographic action are only started after the camera vibration set up by the operation of the shutter release button has sufficiently died away. In this manner, it is possible to prevent waste of battery power due to meaningless blur reduction operation being performed, and image blur reduction is accurately performed during photography.

In the step S37 the display of the camera vibration state on the shake state display device 13 is terminated. In the step S38 a decision is made as to whether or not the current value of the flag is unity, and if the flag is currently set to unity then the flow of control proceeds to the step S40, while if not then the flow of control proceeds to the step S39. In the step S39 a decision is made as to whether or not the time period being timed by the timer has run out, and if the time is not yet up then the flow of control loops back to this step S39, while when the time is up the flow of control proceeds to the step S40. By the processing performed by the above described steps S38 and S39, the flow of control only proceeds to execute the steps S40 and the following after the angular velocity zero voltages calculation time (in this first preferred embodiment, exemplarily about 900 ms) has elapsed from the time point at which detection of angular velocity was started, i.e. after the previously described angular velocity zero voltages have been obtained. And since, in this first preferred embodiment, the focusing process is performed (in the step S20) during this angular velocity zero voltages calculation time period, it is thereby made possible to utilize this angular velocity zero voltages calculation time period effectively, whereby the time period occupied by preparations before actually shooting this photographic frame can be shortened.

Figure 5B:
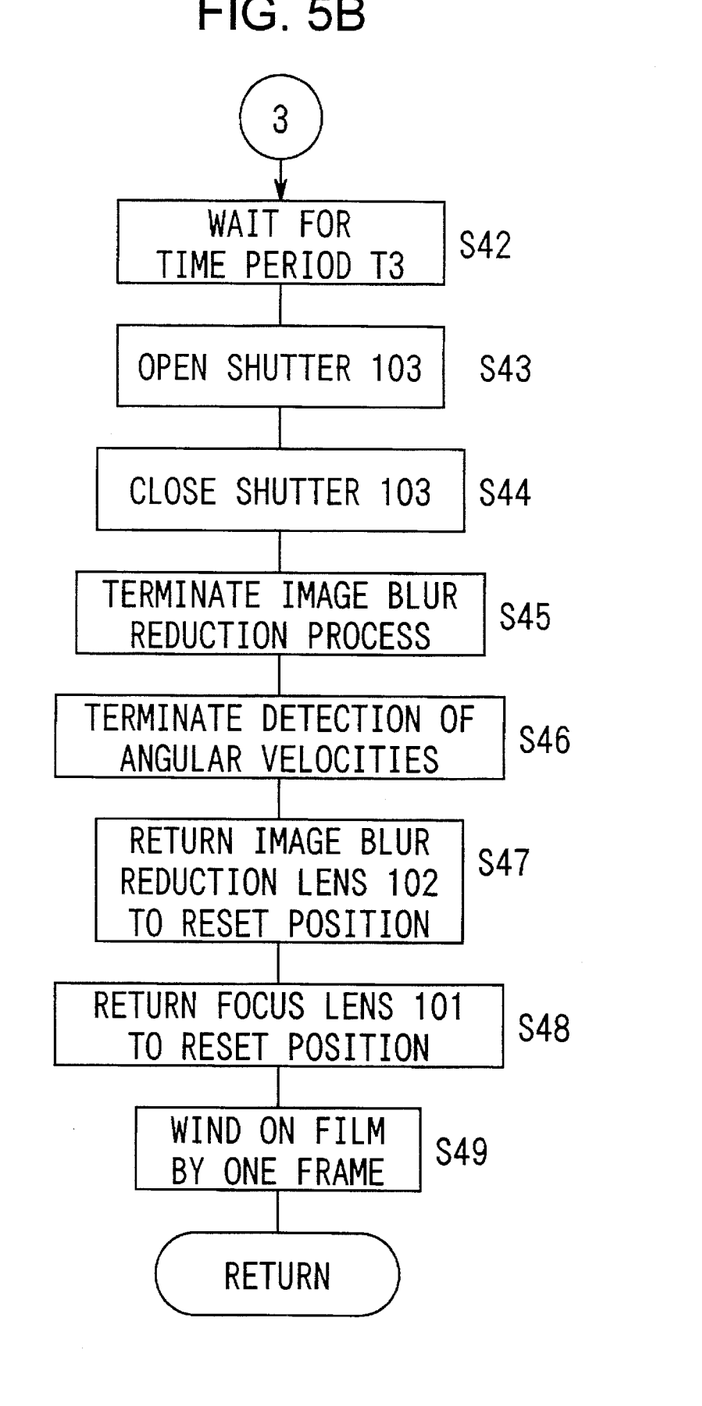

In the step S40, the image blur reduction lens 102 is shifted from a predetermined reset position to its initial position (the position at which the optical axis of the image blur reduction lens 102 and the optical axis of the photographic lens assembly 1 coincide). In the step S41, image blur reduction processing is started. In concrete terms, the actual angular velocities of the camera body are determined corresponding to the amount of camera vibration by taking the angular velocity zero voltages away from the outputs of the angular velocity detection circuits 21 and 22, and amounts for shifting the image blur reduction lens 102 are calculated based upon these actual camera body angular velocities. Further, the drive direction signals and the drive duty factor signals are sent to the motor drive circuits 8 and 9, based upon these calculated lens shift amounts. By doing this, the image blur reduction lens 102 is shifted by the appropriate amounts in the X axis direction and in the Y axis direction to reduce the image blur caused by the camera vibration.

In the step S42, the system waits for a predetermined time period until the movement of the image blur reduction lens 102 has stabilized. I.e., a time counting is started by the CPU 2, and after predetermined time period has elapsed the flow of control continues. This time period will hereinafter be termed the stabilization control time period T3. This is done because for a certain time period directly after the image blur reduction process has been started the movement of the image blur reduction lens 102 is somewhat unstable, due to signal delay inherent in the motor drive circuits 8 and 9 and due to vibration and the like in the mechanical linkage which drives this image blur reduction lens, and, if in this kind of state the shutter 103 is operated to take a photograph, the image blur reduction process will not produce any satisfactory result. Therefore the system waits for the stabilization control time period T3, and thereby only operates the shutter 103 after the movement of the image blur reduction lens 102 has become stable. This stabilization control time period T3 may for example be approximately 20 ms.

In the step S43, the shutter 103 is opened by the motor 3 via the motor drive circuit 7. The opening amount of the shutter 103 depends upon the aperture value which was calculated in the step S17. Further, after a time period has elapsed which corresponds to the shutter speed which was calculated in the step S17, the flow of control proceeds to the step S44 in which the shutter 103 is closed. In the step S45 the image blur reduction process is terminated, i.e. the sending of signals to the motor drive circuits 8 and 9 is terminated, and thereby the transverse movements of the image blur reduction lens 102 are stopped. In this manner, while the shutter 103 is open, i.e. during the exposure process, the image blur reduction lens is shifted appropriately in the X and Y axis directions perpendicular to the optical axis, and thereby image blur caused by vibration of the camera body is reduced or eliminated.

In particular, in this first preferred embodiment of the present invention, since it is ensured that the image blur reduction processing is only performed after the angular velocity zero voltages calculation time period (exemplarily about 900 ms) has elapsed from the start of angular velocity detection, i.e. is only performed after the above described angular velocity zero voltages have been obtained, thereby accurate image blur reduction can be performed based upon the true values for the angular velocities.

In the step S46, signals are sent to the angular velocity detection circuits 21 and 22 in order to terminate the detection of angular velocities thereby. In the step S47, the image blur reduction lens 102 is returned to its above described reset position. In the step S48, the focus lens 101 is returned to its above described reset position. In the step S49, a signal is sent to a film forwarding circuit not shown in the figures, and thereby the film is wound on by one film frame. After this, the flow of control returns from this routine.

Second Embodiment

Figure 6:
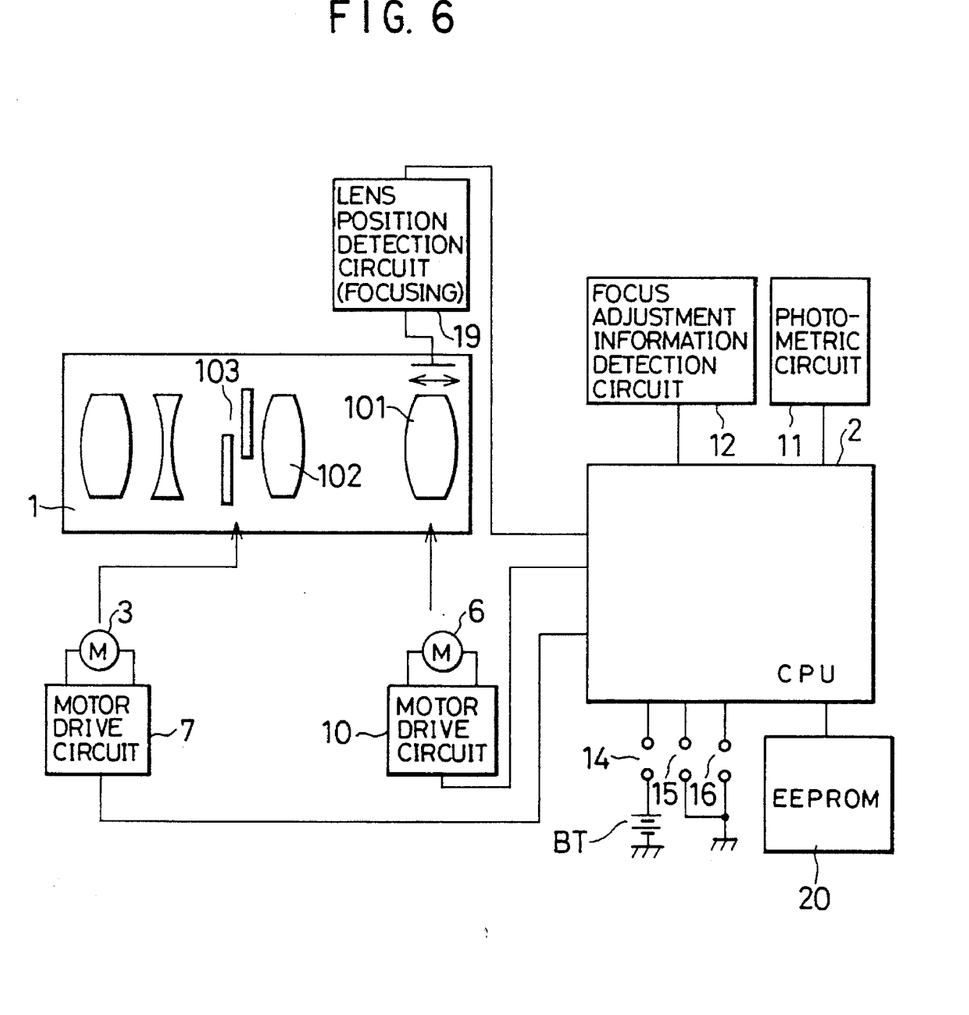
FIG. 6 is a block diagram showing a control system of a camera according to the second preferred embodiment of the present invention.
Figure 7A:
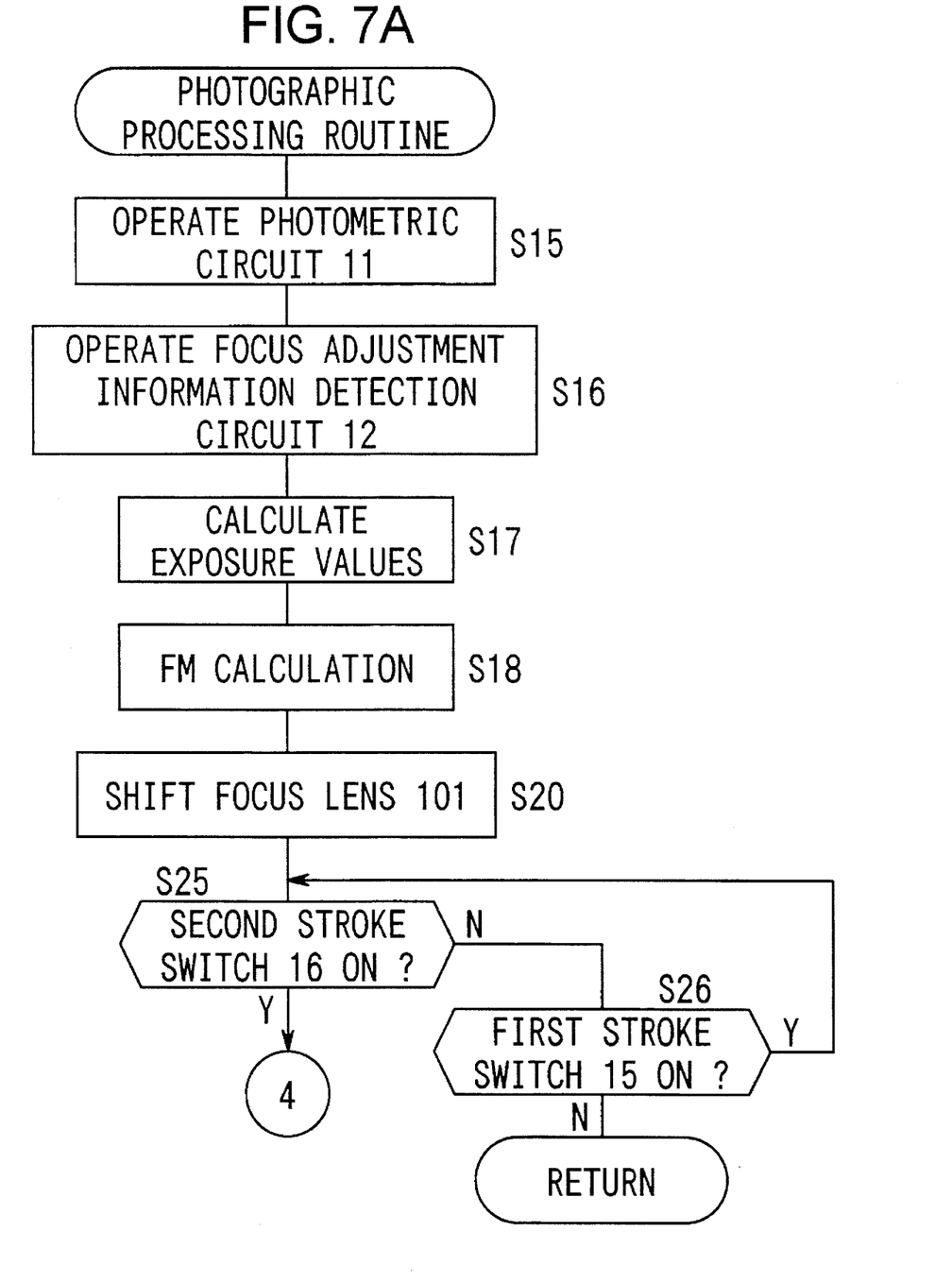
FIGS. 7A and 7B are flow charts which show the details of a similar photographic processing routine executed by a CPU which is incorporated in a camera which is a second preferred embodiment of the present invention.
Figure 7B:
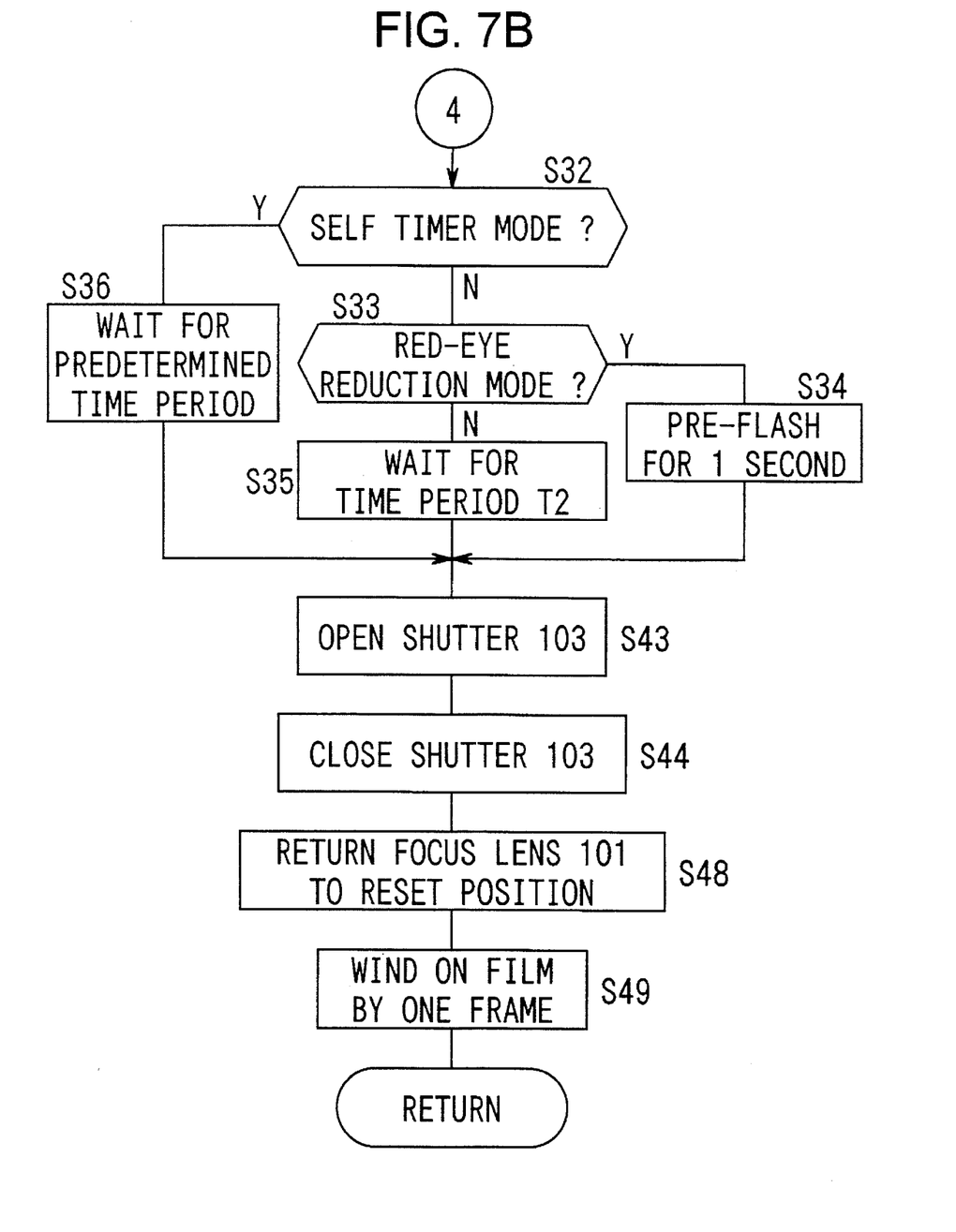

FIGS. 6, 7A and 7B are a block diagram showing the overall structure of a camera which is a second preferred embodiment of the present invention, and flow charts showing the operation of this camera. No image blur reduction device is fitted to this camera.

In the block diagram of FIG. 6 the construction is the same as that of the first preferred embodiment shown in FIG. 1, except that the motors 4 and 5, the motor drive circuits 8 and 9, the camera vibration state display device 13, the lens position detection circuits 17 and 18, and the angular velocity detection circuits 21 and 22 are not provided; other elements are denoted by the same reference numerals as in FIG. 1. In the flow charts of FIGS. 7A and 7B, steps which are the same as corresponding ones in the flow charts for the first preferred embodiment shown in FIGS. 4A through 5B are denoted by the same reference symbols.

In this second preferred embodiment as well, photography is performed only after waiting for the shock avoidance time period T2 from the time point at which the second stroke switch 16 is turned on. Accordingly, this second preferred embodiment is also so constructed that the photographic action is only started after the camera vibration set up by the operation of the shutter release button has sufficiently died away, and thereby image blur is restrained to the minimum level.

Furthermore, it would also be acceptable for the device to be so constructed that not only the angular velocity zero voltages calculation time period, but also the angular velocity detection circuit stabilization time period T1, the shock avoidance time period T2, and the stabilization control time period T3 are stored in the EEPROM 20, and so that the values of these various time periods are read out from the EEPROM 20 when the CPU 2 is performing the initialization processing in the step S1 of FIG. 3 described above. And it would also be possible so to arrange the construction that various sets of the above described time periods are stored, and so that the photographer can select an appropriate one of these sets. Further, it would also be possible for the construction to be such that the photographer is able to change any one of these time periods freely.

Although in the two preferred embodiments described above it was so arranged that the photographic process was completely prevented when the battery voltage was less than a predetermined threshold voltage level, it would also be possible, as an alternative modification, to so arrange matters that, when the battery voltage was low, only the processes of camera vibration detection and image blur reduction (which involve relatively high battery power consumption) are prevented, while the processes of photometry and focus adjustment information detection continue to be performed. Further, in order to save the time which is required for the battery check (about 20 ms), it would also be a desirable modification to perform the timer start in the step S13 straightaway when the camera shutter release button is depressed as far as its first stroke position, and to perform the battery check process (in the step S11) and the start of camera vibration detection (in the step S12) thereafter. In this manner it is possible to ensure that, if the shutter release button is depressed directly all the way to its second stroke position, the time period from the time point when the first stroke switch goes to the on state to the image blur reduction process is kept constant. Further, although it has been shown above by way of example that the physical quantities related to camera vibration amount whose values were detected were the angular velocities of the camera body generated as the result of camera vibration, this is not essential to the principle of the present invention; in a variant embodiment, it would alternatively be possible for the physical quantities whose values were detected to be angular accelerations or changes of angular position.

Yet further, although in the shown preferred embodiments the display of the current camera vibration state was only performed after the system had waited for the angular velocity detection circuit stabilization time period T1, this was only by way of example; in a variant embodiment it would be acceptable to perform this display of camera vibration state from the time point at which the timer for measuring the time period for angular velocity zero voltages calculation had run out. By doing this the reliability of the camera vibration state display is improved. Further, although it was shown by way of example in the description of the above two preferred embodiments that the image blur reduction processing was only performed after the time period for angular velocity zero voltages calculation had elapsed from the start of angular velocity detection, this is not to be considered as limitative of the present invention; in particular, in the case that it is possible to detect the true amount of camera vibration even if the angular velocity zero voltages have not yet been obtained, it will be an acceptable alternative, according to the principle of the present invention, for the image blur reduction processing to be started after a time period has elapsed, from the start of detection of the relevant physical values such as angular velocity or the like, sufficient for the detected values thereof to become stable.

In addition, various types of method can be utilized as the method for detecting the focus adjustment state, such as the method for measuring the distance to the object to be photographed of the type which is used in a lens shutter type camera, or the TTL phase difference detection method of the type that is used in a single lens reflex type camera, or the like. Further, although it was exemplarily shown that the amount of camera vibration was displayed by the use of a flashing LED, this is not intended to be limitative of the present invention; other display methods might be used. Yet further, although the present invention has been described in terms of its application to a camera of the normal type in which a light sensitive film is used as the photographic medium, this is not to be considered as limitative of the present invention, which could also be applied to an electronic still camera in which the photographic information is recorded upon a floppy disk, or to a video camera or the like.

We claim:

1. A camera capable of image blur reduction, comprising:

a command device that outputs a photography preparation command by an operation for photography preparation and outputs a photography starting command by an operation for photography;

a camera vibration detection device that detects a value of physical quantity related to an amount of camera vibration in response to said photography preparation command;

an image blur reduction device that, in response to said photography starting command, performs an image blur reduction operation based upon an output of said camera vibration detection device in order to reduce blurring of a photographic image caused as a result of camera vibration;

an operation control device that prevents an operation of said image blur reduction device until a first predetermined time period from starting of operation of said camera vibration detection device elapses and operates said image blur reduction device in response to said photography starting command after said first predetermined time period has elapsed; and a photographing control device that prevents photography until a second predetermined time period from starting of operation of said image blur reduction device elapses and performs photography after said second predetermined time period has elapsed.

2. A camera according to claim 1, wherein said first predetermined time period is a time period that is sufficient for said output of said camera vibration detection device to be stabilized and said second predetermined time period is a time period that is sufficient for said operation of said image blur reduction device to be stabilized.

3. A camera according to claim 1, further comprising a memory capable of data reading and writing, in which at least one of said first and second time periods is stored.

4. A camera according to claim 1, wherein said operation control device prevents said operation of said image blur reduction device until both said first predetermined time period and a third predetermined time period from said photography starting command elapse and operates said image blur reduction device after said first and third predetermined time periods have elapsed.

5. A camera according to claim 4, wherein said first predetermined time period is a time period that is sufficient for said output of said camera vibration detection device to be stabilized, said second predetermined time period is a time period that is sufficient for said operation of said image blur reduction device to be stabilized and said third predetermined time period is a time period that is sufficient to allow vibration of said camera generated as a result of said operation for photography to die away.

6. A camera according to claim 4, further comprising a memory capable of data reading and writing, in which at least one of said first, second and third time periods is stored.

7. A camera capable of image blur reduction, comprising:

a command device that outputs a photography starting command by an operation for photography;

a camera vibration detection device that detects a value of physical quantity related to an amount of camera vibration;

an image blur reduction device that performs an image blur reduction operation based upon an output of said camera vibration detection device in order to reduce blurring of a photographic image caused as a result of camera vibration;

an operation control device that prevents an operation of said image blur reduction device until a first predetermined time period from starting of operation of said camera vibration detection device elapses and operates said image blur reduction device in response to said photography starting command after said first predetermined time period has elapsed; and a photographing control device that prevents photography until a second predetermined time period from starting of operation of said image blur reduction device elapses and performs photography after said second predetermined time period has elapsed.

8. A camera according to claim 7, wherein said first predetermined time period is a time period that is sufficient for said output of said camera vibration detection device to be stabilized and said second predetermined time period is a time period that is sufficient for said operation of said image blur reduction device to be stabilized.

9. A camera according to claim 7, further comprising a memory capable of data reading and writing, in which at least one of said first and second time periods is stored.

10. A camera according to claim 7, wherein said operation control device prevents said operation of said image blur reduction device until both said first predetermined time period and a third predetermined time period from said photography starting command elapse, and operates said image blur reduction device after said first and third predetermined time periods have elapsed.

11. A camera according to claim 10, wherein said first predetermined time period is a time period that is sufficient for said output of said camera vibration detection device to be stabilized, said second predetermined time period is a time period that is sufficient for said operation of said image blur reduction device to be stabilized and said third predetermined time period is a time period that is sufficient to allow vibration of said camera generated as a result of said operation for photography to die away.

12. A camera according to claim 9, further comprising a memory capable of data reading and writing, in which at least one of said first, second and third time periods is stored.

13. A camera capable of image blur reduction, comprising:

a command device which outputs a photography command in response to a operation for photography;

a photographic device which performs photography;

a camera vibration detection device which detects a value of a physical quantity related to amount of camera vibration;

an image blur reduction device which performs image blur reduction operation based upon an output of said camera vibration detection device in order to reduce blurring of a photographic image caused as a result of camera vibration; and a control device which actuates said image blur reduction device and said photographic device after a predetermined time period has elapsed from a time point that said photography command was output.

14. A camera capable of image blur reduction according to claim 13, wherein said predetermined time period is a time period which is sufficient to allow vibration of said camera generated as a result of said operation for photography to die away.

15. A camera capable of image blur reduction according to claim 13, wherein said control device comprises a timer unit which starts operation to count time upon an output of said photography command and which outputs a time up signal when said predetermined time period has expired, and a photography control unit which actuates said photographic device in response to the output of said time up signal.

16. A camera capable of image blur reduction according to claim 15, wherein said predetermined time period is a time period which is sufficient to allow vibration of said camera generated as a result of said operation for photography to die away.

17. A camera capable of image blur reduction according to claim 13, further comprising a storing device in which said predetermined time period is stored in advance, and a read out device which reads out said predetermined time period from said storing device; and wherein said control device actuates said photographic device after said predetermined time period which has been read out by said read out device has elapsed from the time point that said photography command was output.

18. A camera capable of image blur reduction, comprising:

a command device which outputs a photography command in response to a operation for photography;

a photographic device which performs photography;

a camera vibration detection device which detects a value of a physical quantity related to amount of camera vibration;

an image blur reduction device which performs image blur reduction operation based upon an output of said camera vibration detection device in order to reduce blurring of a photographic image caused as a result of camera vibration; and a control device which starts the operation of said image blur reduction device after a first predetermined time period has elapsed from a time point that said photography command was output, and actuates said photographic device after a second predetermined time period has elapsed from a time point of starting of the operation of said image blur reduction device.

19. A camera capable of image blur reduction according to claim 18, wherein said first predetermined time period is a time period which is sufficient to allow vibration of said camera generated as a result of said operation for photography, and said second predetermined time period is a time period sufficient for the operation of said image blur reduction device to become stabilized.

20. A camera capable of image blur reduction, comprising:

a command device which outputs a photography command in response to a operation for photography;

a photographic device which performs photography in response to said photography command;

a camera vibration detection device which detects a value of a physical quantity related to amount of camera vibration;

an image blur reduction device which, during photography, performs image blur reduction operation based upon output of said camera vibration detection device in order to reduce blurring of a photographic image caused as a result of camera vibration; and an inhibition device which inhibits the operation of said image blur reduction device and of said photographic device until a predetermined time period has elapsed from a time point that said photography command was output.

* * * * *